May 27, 1924.
J. C. ALLEN
TIRE MACHINE
Filed Aug. 16, 1919
1,495,237
2 Sheets-Sheet 2
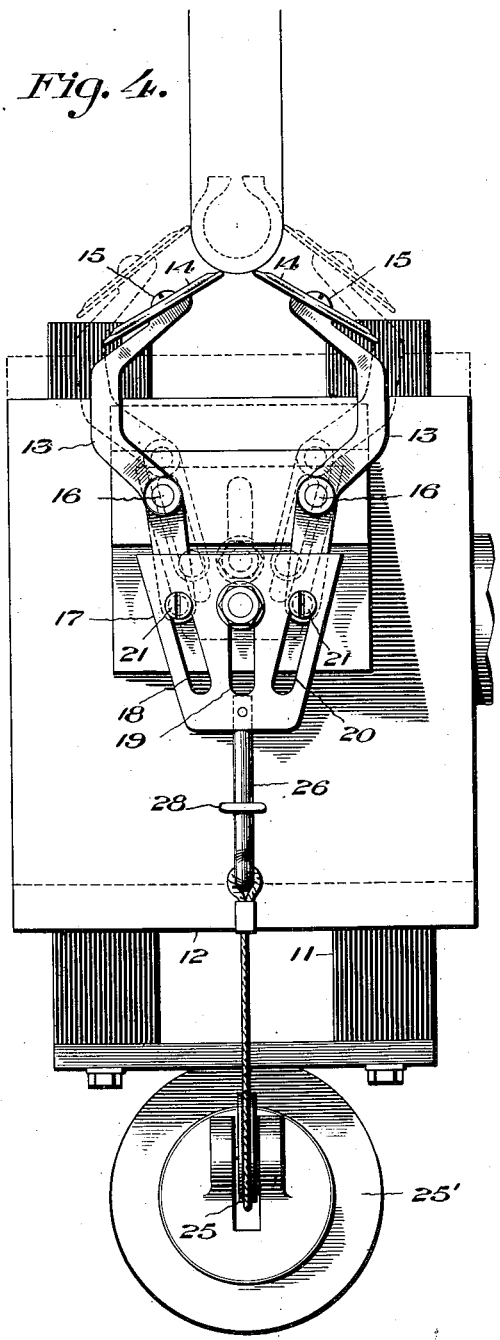
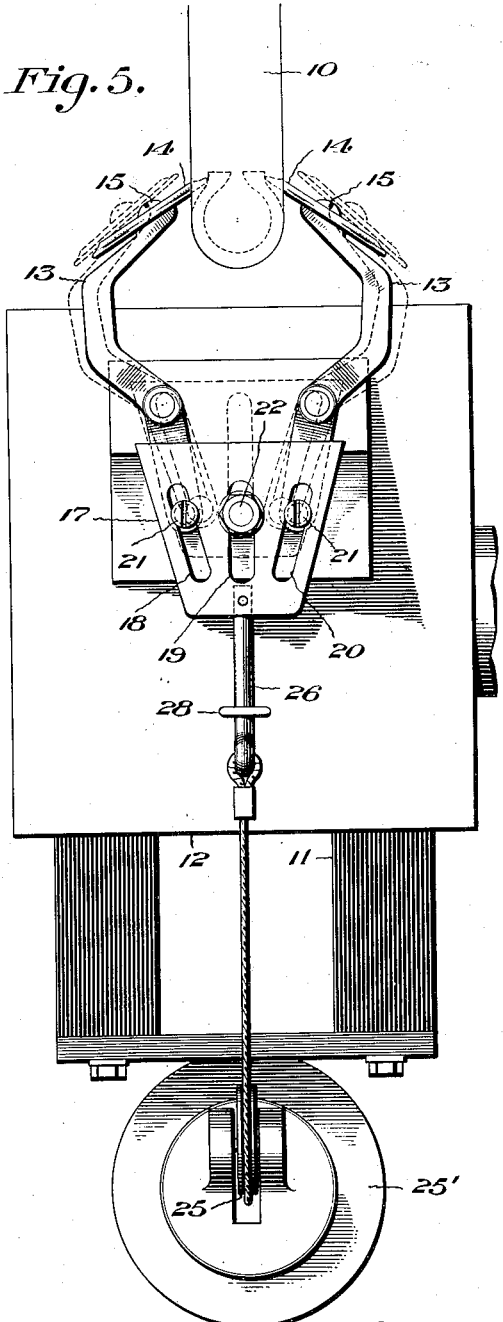
Inventor
J. C. Allen
By C. H. Landon
Attorney Patented May 27, 1924.

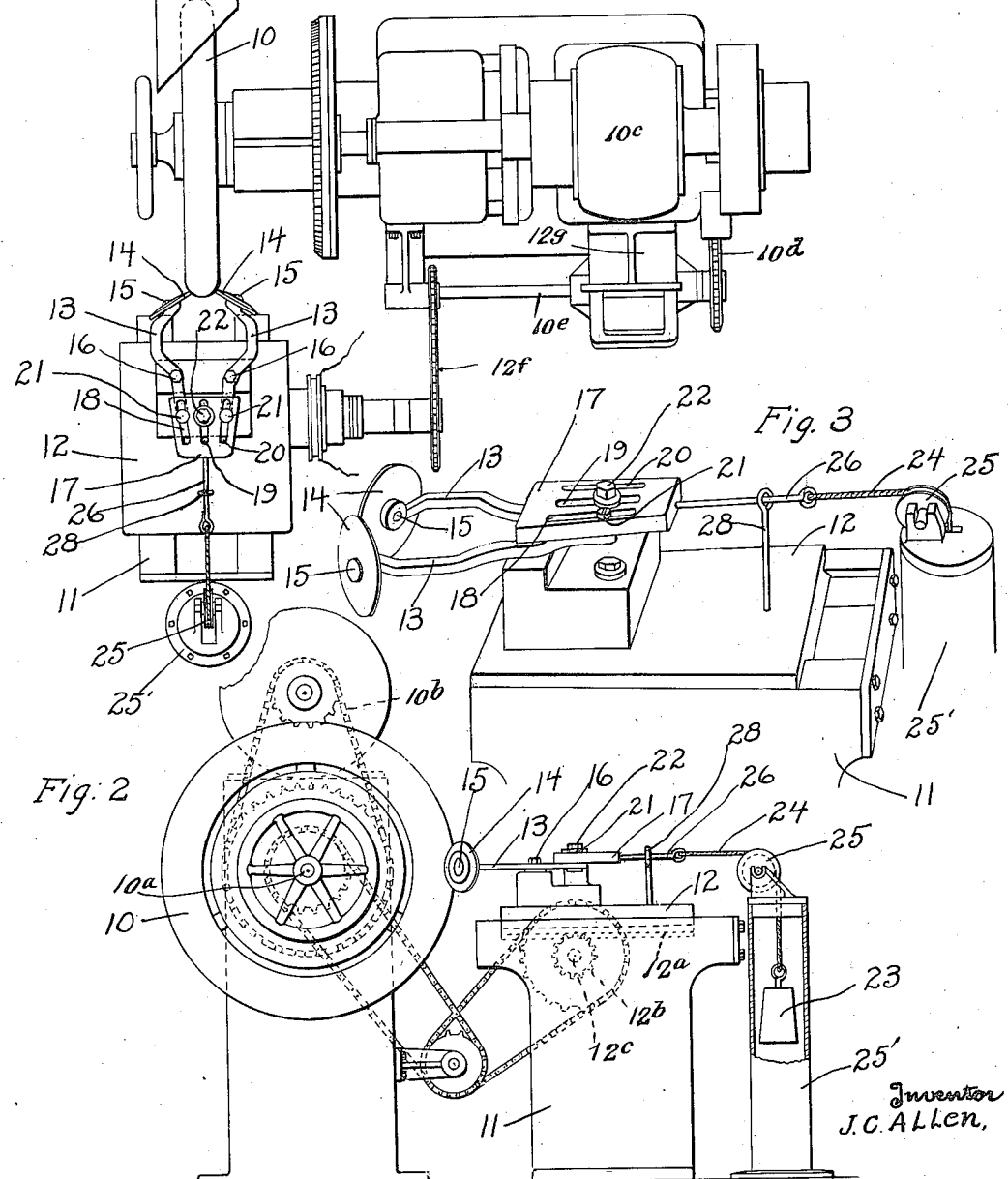

1,495,237

UNITED STATES PATENT OFFICE.

JOHN C. ALLEN, OF MERIDIAN, MISSISSIPPI, ASSIGNOR TO THE GOODYEAR TIRE & RUBBER COMPANY, OF AKRON, OHIO, A CORPORATION OF OHIO.

TIRE MACHINE.

Application filed August 16, 1919. Serial No. 317,946.

*To all whom it may concern:*

Be it known that I, JOHN C. ALLEN, a citizen of the United States, and resident of Meridian, Mississippi, have invented new and useful Improvements in Tire Machines, of which the following is a specification.

The present invention relates to tire building machines, and more particularly to machines for building the fabric carcasses of tires of the pneumatic type.

The many objects and advantages of my improved mechanism will be apparent from a perusal of the drawings and specification together with the appended claims.

In the drawings, wherein there has been illustrated a preferred embodiment of the invention and throughout the several views of which, similar reference numbers designate corresponding parts:

Figure 1 is a top plan view of the tire building machine;

Figure 2 is a side elevational view of the fabric-shaping mechanism mounting;

Figure 3 is a perspective detail of the cam operating mechanism.

Fig. 4 is a top plan view illustrating, in full lines, the position of the parts at the beginning of the stitching operation, and in dotted lines, an intermediate position of the mechanism; and Fig. 5 is a similar view illustrating, in full lines, the position of the parts when the stitching operation is completed, and, in dotted lines, the position in which the mechanism is adjusted before the carriage is actuated to return the parts to their starting position.

The type of tire building machine conventionally illustrated is that more largely used commercially but I desire it, of course, to be understood that my improved fabric shapers and mounting may be applied to any suitable type of tire machine which embodies the essential elements of a driven core and a fabric shaping mechanism.

In this instance the core, designated by the numeral 10, is removably mounted upon a rotatable shaft $10^a$, which is driven by sprocket and chain connections $10^b$ from a motor $10^c$. A base 11 is provided and serves as a support for a reciprocating carriage 12, which is actuated, from the motor $10^c$, by means of the chain drive $10^b$ and an auxiliary shaft $10^e$. As shown in Fig. 2, the carriage is provided with a rack $12^a$, which meshes with a pinion $12^b$ that is fixed upon a shaft $12^c$. The shaft $12^c$ is journalled in the support 11 and is driven from the auxiliary shaft $10^e$ by sprocket and chain connections $12^f$. Any suitable type of speed control and reversing mechanism may be utilized for controlling the movement of the carriage, such, for instance, as that indicated generally at $12^g$. Upon the forward end of the carriage is pivotably mounted a pair of fabric-shaper supporting arms 13 to the free ends of which are mounted upon axles 15, fabric shaping discs 14. The arms 13 are pivoted to the carriage at their approximate middle by bolts or pins 16. Mounted above the arms 13, and in correct relation therewith, is a cam plate 17 which has cut through its body portion three slots 18, 19 and 20. The slots 18 and 20 are cut at a slight angle to the main axis of the plate and receive therein shoulder bolts 21 carried by the rear ends of the arms 13. The center slot 19 is cut parallel to the main axis of the plate and operates on a stud or bolt 22 secured in the carriage 12 later to be described. Each of the bolts 21 and the bolt 22 have a head or nut above the cam to retain the same against displacement.

A weight 23 secured to one end of a cable 24 which is passed over a sheave wheel or pulley 25 mounted upon the base 25', or at any suitable place free of the carriage and is fastened to an arm 26 mounted in the rear end of the cam plate 17. To prevent side movement of the cam plate the arm 26 is preferably projected through an eye bolt 28 or any other suitable bearing device, which is supported by the carriage head 12. Thus it will be seen that the cam plate 17 is mounted in a floating manner, which permits a very flexible movement of the fabric shaper arms 13.

Operation.

Assuming that a fresh ply of fabric has been applied to the core, the operator, by means of the speed control mechanism $12^g$, will set the core 10 in motion and cause the carriage 12 to advance in the direction thereof. Normally the fabric shaping discs are held in approximately the relation shown in Fig. 4 of the drawing by the cam plate 17, which is held in its rearmost position by the weight 23. As the carriage is caused to advance toward the core and the fabric shaping elements contact therewith, the supporting arms 13 are swung about the pivot 16 and the cam plate 17 is advanced during such action by means of the bolts 21 acting against the inner walls of the inclined slots 18 and 20. Until the fabric shaping discs reach the position shown in dotted lines in Fig. 4, the cam plate 17 moves faster than the carriage 12, as will be obvious, inasmuch as it moves forward with the carriage 12, and an additional forward movement is imparted thereto by the action of the arms 13 as the fabric working elements travel around the core. As the carriage continues in its forward movement from the position shown in dotted lines in Fig. 4, obviously, a reverse movement is imparted to the arms 13, and the cam plate 17 is moved rearwardly with relation to the arms. At the same time the cam is being carried forward by the carriage 12 through the action of the weight 23. It will be noted that throughout the stitching operation a pressure is exerted upon the fabric as the weight 23 constantly retards the movement of the cam 17 in its forward travel, and causes the arms 13 at all times to move against a force which affects a yielding resistance to such movement.

In order to withdraw the carriage and stitchers from the position shown in full lines in Fig. 5 to repeat the foregoing operation, the operator may move the cam 17 forward by means of the arm 26, and the fabric working elements will be separated, as shown in dotted lines in this figure. The carriage drive may now be reversed by means of the previously described mechanism 12$^g$ to retract the fabric working elements and return the parts to their starting position.

It will be evident that various pressures upon the fabric may be attained through the use of different weights and different arrangements of the slots 18 and 20, and the arms 13.

What I claim is:

1. The combination with a tire building machine including a rotatable core, a reciprocable carriage, and a pair of stitcher elements for working fabric upon the core, of stitcher mountings upon the carriage adapted for relative movement to adjust the stitchers transversely of the core, and cam means actuated through such movement of the stitchers to yieldingly resist relative movement of the mountings.

2. The combination with a tire building machine including a rotatable core, a reciprocable carriage, and a pair of stitcher elements for working fabric upon the core, of mountings upon the carriage adapted for relative movement to adjust the stitchers transversely of the core, and a floating cam connecting the mountings and actuated through such movement of the stitchers to yieldingly resist relative movement of the mountings.

3. The combination with a tire building machine including a rotatable core, a reciprocable carriage, and a pair of stitcher elements for working fabric upon the core, of stitcher mountings upon the carriage adapted for relative movement to adjust the stitchers transversely of the core, a sliding cam actuated through such movement of the stitchers to yieldingly resist relative movement of the mountings, and means for normally urging the cam in one direction.

4. A tire building machine including a rotatable core, means for driving said core, a carriage, means for driving said carriage, fabric shaping elements mounted upon said carriage, a floating cam carried by said carriage, and means for normally urging the cam in one direction.

5. A tire building machine including a rotatable core, a support for said core, means for driving said core, a standard juxtaposed to the core, a carriage slidably mounted upon the said standard, means for driving the said carriage, fabric shaping elements mounted upon said carriage, a floating cam carried by said carriage and flexibly connected to said fabric shaping elements, and means for normally urging the cam in one direction.

6. A tire building machine including a rotatable core, a support for said core, means for driving said core, a standard juxtaposed to the core, a carriage slidably mounted upon the said standard, means for driving the said carriage, fabric shaper arms pivotably mounted upon said carriage and supporting at their outer extremities in a revoluble manner fabric shaping discs, a cam slidably mounted upon said carriage, said cam having cut through its body portion a plurality of slots for flexible engagement with the inner extremities of the said fabric shaper arms, and means connected to said cam but mounted independently of said carriage whereby said cam is normally urged in one direction.

7. A tire building machine including a rotatable core, a support for said core, means for driving said core, a standard juxtaposed to the core, a carriage slidably mounted upon the said standard, means for driving the said carriage, fabric shaper arms pivotably mounted upon said carriage and supporting at their outer extremities in a revoluble manner fabric shaping discs, a cam slidably mounted upon the carriage, said cam having cut through its body portion a plurality of slots for flexible engagement with the inner extremities of the said fabric shaper arms, a cable connected to the cam and arranged over a pulley supported independently of the carriage and a weight secured to the cable whereby said cam is normally urged in one direction.

8. The combination with a tire building machine including a rotatable core, a reciprocable carriage, and a pair of stitcher elements for working fabric upon the core, of stitcher mountings pivoted upon the carriage for relative movement to adjust the stitchers transversely of the core, and a cam slidably mounted upon the carriage and actuated through such movement of the stitchers to yieldingly resist relative movement of the mountings.

9. The combination with a tire building machine including a rotatable core, a reciprocable carriage, and a pair of stitcher elements for working fabric upon the core, of stitcher mountings pivoted upon the carriage for relative movement to adjust the stitchers transversely of the core, a cam slidably mounted upon the carriage and actuated through such movement of the stitchers to yieldingly resist relative movement of the mountings, and means for guiding the cam in its movement.

10. The combination with a tire building machine including a rotatable core, a reciprocable carriage, and a pair of stitcher elements for working fabric upon the core, of stitcher mountings pivoted upon the carriage for relative movement to adjust the stitchers transversely of the core, a cam slidably mounted upon the carriage and actuated through such movement of the stitchers to yieldingly resist relative movement of the mountings, means for guiding the cam in operation, and means for normally urging the cam in one direction.

In witness whereof, I have hereunto signed my name in the presence of two subscribing witnesses.

JOHN C. ALLEN.

Witnesses:
I. W. SEMMES,
J. H. SEMMES.